US008551192B2

(12) United States Patent
Sun et al.

(10) Patent No.: US 8,551,192 B2
(45) Date of Patent: Oct. 8, 2013

(54) MISCIBILITY OF OTHERWISE IMMISCIBLE COMPOUNDS

(75) Inventors: Qun Sun, Wilmington, DE (US); Edwin L. McInnis, Zachary, LA (US)

(73) Assignee: Invista North America S.A.R.L., Wilmington, DE (US)

( * ) Notice: Subject to any disclaimer, the term of this patent is extended or adjusted under 35 U.S.C. 154(b) by 706 days.

(21) Appl. No.: 12/424,082

(22) Filed: Apr. 15, 2009

(65) Prior Publication Data
US 2010/0264365 A1 Oct. 21, 2010

(51) Int. Cl.
*B01F 3/08* (2006.01)

(52) U.S. Cl.
USPC ................ 23/293 R; 252/182.11; 252/182.29

(58) Field of Classification Search
USPC ........................ 252/182.11, 182.29; 23/293 R
See application file for complete search history.

(56) References Cited

U.S. PATENT DOCUMENTS

| 3,282,875 | A | | 11/1966 | Connolly at al. |
| 3,308,069 | A | | 3/1967 | Wadlinger at al. |
| 3,702,886 | A | | 11/1972 | Argauer et al. |
| 4,163,115 | A | * | 7/1979 | Heinsohn et al. ............. 560/240 |
| 4,226,756 | A | | 10/1980 | Critchfield et al. |
| 4,226,757 | A | | 10/1980 | Jones et al. |
| 4,228,272 | A | * | 10/1980 | Del Pesco ..................... 528/413 |
| 4,385,133 | A | | 5/1983 | Alberino et al. |
| 4,439,409 | A | | 3/1984 | Puppe et al. |
| 4,492,613 | A | | 1/1985 | Wootton |
| 4,826,667 | A | | 5/1989 | Zones et al. |
| 4,954,325 | A | | 9/1990 | Rubin et al. |
| 5,149,862 | A | * | 9/1992 | Dorai et al. ................... 560/240 |
| 5,236,575 | A | | 8/1993 | Bennett et al. |
| 5,250,277 | A | | 10/1993 | Kresge et al. |
| 5,362,697 | A | | 11/1994 | Fung et al. |
| 5,466,778 | A | * | 11/1995 | Lambert et al. ............... 528/361 |
| 6,063,308 | A | * | 5/2000 | Falke et al. ................ 252/182.2 |
| 6,093,342 | A | | 7/2000 | Falke et al. |
| 6,197,979 | B1 | * | 3/2001 | Becker et al. ................. 549/472 |

FOREIGN PATENT DOCUMENTS

EP      0492807 A2   7/1992

OTHER PUBLICATIONS

Chem. Rev. 1998, 98, pp. 171-198.

* cited by examiner

*Primary Examiner* — Lorna M Douyon
*Assistant Examiner* — Amina Khan
(74) *Attorney, Agent, or Firm* — Robert B. Furr, Jr.; Dennis P. Santini

(57) ABSTRACT

The present invention relates to a novel method for compatibilizing, i.e. improving miscibility of, otherwise immiscible organic materials highly useful in the fibers industry, as well as the compatibilized product of the method. These compatibilized products are stable in the liquid phase at temperatures ranging from about 40° C. to about 200° C. The method involves use of a glycol derived from polymerization of alkylene oxide and tetrahydrofuran, the alkylene oxide having from 2 to 4 carbon atoms, i.e. poly(tetramethylene-co-alkyleneether) glycol, in the mixture.

12 Claims, No Drawings

MISCIBILITY OF OTHERWISE IMMISCIBLE COMPOUNDS

BACKGROUND OF THE INVENTION

The present invention relates to a novel method for compatibilizing, i.e. improving miscibility of, otherwise immiscible organic materials highly useful in, for example, the fibers industry, as well as the compatibilized product of the method. These compatibilized products are stable in the liquid phase at temperatures ranging from about 40° C. to about 200° C., more specifically from about 50° C. to about 100° C., depending on the phase separation transition and decomposition temperatures of the individual components of the compatibilized product. The method involves use of a glycol derived from polymerization of alkylene oxide and tetrahydrofuran (THF), the alkylene oxide having from 2 to 4 carbon atoms, i.e., poly(tetramethylene-co-alkyleneether) glycol, especially such a copolymer specially manufactured as herein described. The glycol derived from polymerization of alkylene oxide and THF may be referred to herein as an alkylene oxide copolymer. Non-limiting examples of such alkylene oxide copolymers for use herein include the poly(tetramethylene-co-alkyleneether) glycols derived from one alkylene oxide, e.g. ethylene oxide (EO), molecule and two THF molecules; one alkylene oxide, e.g. EO, molecule and three THF molecules, etc.

Mixtures of short chain glycols with long chain polyols, and polyethers with polyesters, normally immiscible or rapidly losing miscibility at temperatures within the range of from about 40° C. to about 100° C. have a variety of important commercial uses. For example, ethylene glycol (EG) and butanediol (BDO) are generally immiscible with polyether polyols such as polytetramethylene ether glycol (PTMEG) at these temperatures. Such mixtures are important commercially for the preparation of polyurethane elastomers, coatings and adhesives by the reaction of this mixture with one or more diisocyanates and assorted additives. Further, polyethylene glycol (PEG) and polypropylene glycol (PPG) are generally immiscible with polyether polyols such as polytetramethylene ether glycol (PTMEG) at these temperatures. These later mixtures are important commercially for the preparation of moisture permeable or absorbent articles. Mixtures of polyethers such as PTMEG and polypropylene glycol (PPG) with polyesters such as polycaprolactone glycol (PCLG) are generally immiscible at these temperatures and they are commercially useful for making a broad range of elastomers and coatings requiring ether and ester properties.

Due to the importance of these compounds being compatible in mixture at temperatures within the range of from about 40° C. to about 100° C. or higher, researchers have tried to effect compatibility by a variety of different methods. For example, techniques have been described for solubilizing some of these mixtures for commercial applications, but they have troublesome shortcomings or deficiencies which create processing and handling problems which add to costs for production of, for example, polyurethane elastomers, coatings, adhesives and foams.

U.S. Pat. No. 4,226,756 describes compositions of polyols and ethylene glycol in which the polyol contains internal oxyethylene and oxypropylene groups and additional oxyethylene end groups. These compositions are limited to polyols with a polyoxypropylene polyoxyethylene glycol structure. Additionally, the balance of oxyethylene internal and end groups is an important variable in the function of the materials as compatibilizers.

U.S. Pat. No. 4,385,133 describes a process for the preparation of polyurethane in which a low molecular weight glycol is rendered miscible in a polyol mixture by employing two polyoxypropylene polyoxyethylene polyols of varying molecular weight and ethylene oxide (EO) content. This process requires the presence of two polyoxypropylene polyoxyethylene glycols of different molecular weights and oxyethylene content.

U.S. Pat. No. 6,063,308 details a process for making a homogeneous mixture of curative, polyol, and other materials by allowing the mixture to react with a small amount of a diisocyanate and a 2° or 3° amine. This process is of limited utility because the components must undergo a chemical reaction in order to become homogeneous and requires intensive mixing. It is likely that the desired reaction product is also of a higher viscosity than the starting materials, and is not described or characterized.

U.S. Pat. No. 6,093,342 teaches a variation of the process of above U.S. Pat. No. 6,063,308 in which two immiscible high molecular polyols and optionally a low molecular weight glycol are compatibilized by allowing the mixture to react with a small amount of a diisocyanate and a 2° or 3° amine. This process also requires intensive mixing so that the materials can react chemically. The uncharacterized composition product of this reference must be higher in viscosity than the starting materials, and is not described or characterized. Processes for homogenizing mixtures of polyether and polyester are also described.

The techniques of the above patent references have serious commercial limitations in that they are restricted to a particular class of polyols (polyoxypropylene polyoxyethylene polyols) or they entail the use of reactive components and efficient mixing of the incompatible components which is complicated and nontrivial on a large commercial scale. None of these references teach or suggest a method for preparing a compatibilized mixture of otherwise immiscible organic materials stable in the liquid phase at temperatures ranging from about 40° C. to about 200° C., more specifically from about 50° C. to about 100° C., depending on the phase separation transition and decomposition temperatures of the components of the compatibilized product, or the compatibilized composition comprising a glycol derived from polymerization of alkylene oxide and tetrahydrofuran (THF), the alkylene oxide having from 2 to 4 carbon atoms, i.e. poly(tetramethylene-co-alkyleneether) glycols. These compatibilized compositions have the unique combination of properties disclosed herein, such as, by way of non-limiting examples, remaining homogeneous in the temperature range of from about 40° C. to about 200° C., more specifically from about 50° C. to about 100° C., so that they are easy to handle in a commercial environment and can be used without agitation. These compositions can produce polymers with properties comparable to those made from difficult to handle, incompatible components.

SUMMARY OF THE INVENTION

Accordingly, it is desirable to provide a method for compatibilizing or improving miscibility of otherwise immiscible organic materials highly useful in, for example, the coatings, adhesives, sealant, and elastomer industries, as well as the compatibilized product of the method. When used as an elastomeric soft segment, such as for cast polyurethane wheels and rollers, the novel compatibilized product of the present invention will have well-balanced tensile properties, tear properties, and dynamic properties as well as desirable processing characteristics. Another advantage of such a compatibilized product may be to enable manufacture of low temperature processed products having unique properties.

Therefore, important embodiments of the present invention provide novel compatibilized products comprising a mixture of short chain glycols with long chain polyols, and polyethers with polyesters, normally immiscible or rapidly losing miscibility at temperatures within those required in the industry, such as, for example, from about 40° C., below the phase separation transition temperatures of some glycols, to the temperature at which component decomposition occurs, such as, for example, about 200° C. The compatibilized products resulting from the present invention have unique combinations of properties, along with miscibility at temperatures within the industry useful range of from about 40° C. to about 200° C., more specifically from about 50° C. to about 100° C., depending on the phase separation transition and decomposition temperatures of the individual components of the compatibilized product, said properties including uniform viscosity and density, as well as long and useful shelf life.

More specifically, an important embodiment of the present invention is a compatibilized product comprising a mixture of ethylene glycol (EG) and/or butanediol (BDO) with polyether polyols such as, for example, polytetramethylene ether glycol (PTMEG), polypropylene glycol (PPG) and/or polycaprolactone glycol (PCLG), at these temperatures.

Also more specifically, an important embodiment of the present invention is a compatibilized product comprising a mixture of polyethylene glycol (PEG) with polyether polyols such as, for example, polytetramethylene ether glycol (PTMEG) and/or polypropylene glycol (PPG), at these temperatures.

DETAILED DESCRIPTION

As a result of intense research in view of the above, we have found that we can manufacture novel compatibilized products comprising two or more otherwise immiscible organic materials, i.e. compounds, said compatibilized products being stable in the liquid phase at temperatures ranging from about 40° C. to about 200° C., more specifically from about 50° C. to about 100° C., depending on the phase separation transition and decomposition temperatures of the individual components of the compatibilized product, by a method comprising use of a glycol derived from polymerization of alkylene oxide and tetrahydrofuran, the alkylene oxide having from 2 to 4 carbon atoms, i.e. poly(tetramethylene-co-alkyleneether) glycol, especially such a copolymer specially manufactured as herein described. The glycols for use herein, also referred to as alkylene oxide copolymers, are derived from polymerization of alkylene oxide having from 2 to 4 carbon atoms and THF. Non-limiting examples of such alkylene oxide copolymers for use herein include the poly(tetramethylene-co-alkyleneether) glycols derived from one alkylene oxide, e.g. ethylene oxide (EO), molecule and two THF molecules; one alkylene oxide, e.g. EO, molecule and three THF molecules, etc.

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin (α-olefin), such as by way of example propylene and 1-hexene, or an alkylene oxide such as ethylene oxide and tetrahydrofuran. However, the term "copolymer" is also inclusive of, for example, the copolymerization of a mixture of ethylene, propylene, 1-hexene, and 1-octene, or a mixture of various alkylene glycols and tetrahydrofuran.

As used herein, mole percent ("mole %"), unless noted otherwise, means a percent of a particular component based on the total moles of the mixture containing the component. For example, if a mixture contains three moles of compound A and one mole of compound B, then the compound A comprises 75 mole % of the mixture and the compound B comprises 25 mole %. This theory applies for designations of weight percent ("wt. %") as well.

As used herein, the term "phase separation transition temperature" means the temperature at which a component of the novel compatibilized product composition of the present invention separates from the stable liquid phase at atmospheric pressure. For example, U.S. Pat. No. 4,492,613 teaches that the phase separation transition temperature for methanol and cyclohexane (50:50 weight ratio) at atmospheric pressure is about 40° C.

As used herein, the term "compatibilizing" means manufacturing by the method of the present invention a stable homogeneous mixture of two or more otherwise generally immiscible organic compounds. The term "compatibilized product" means a stable homogeneous mixture of two or more otherwise generally immiscible organic compounds made by the method of the present invention. The term "stable" means not changing form, phase or chemical nature in the liquid phase at temperatures ranging from about 40° C. to about 200° C., more specifically from about 50° C. to about 100° C., depending on the phase separation transition and decomposition temperatures of the individual components of the compatibilized product.

The novel compatibilized product composition of the present invention comprises from about 10 to about 45 wt. %, for example, from about 12 to about 40 wt. %, of one or a mixture of first organic compounds, such as, for example, short chain glycols; from about 10 to about 45 wt. %, for example, from about 12 to about 40 wt. %, of one or a mixture of other, i.e. second, organic compounds generally immiscible with said first organic compounds, such as, for example, long chain polyols, and from about 10 to about 80 wt. %, for example, from about 20 to about 76 wt. %, of a glycol derived from polymerization of an alkylene oxide, for example allcylene oxide of from 2 to 4 carbon atoms, e.g. ethylene oxide (EO), a propylene oxide or a butylene oxide, and tetrahydrofuran (THF), especially such a copolymer specially manufactured as herein described.

The copolymer of alkylene oxide and tetrahydrofuran, i.e. poly(tetramethylene-co-alkyleneether) glycol, required for use herein may be manufactured by the process comprising contacting a solution of 68 to 94 parts tetrahydrofuran, 5 to 30 parts alkylene oxide, e.g. ethylene oxide, and 0.2 to 1.5 parts compound containing reactive hydrogen atoms, e.g. water, with a polymerization catalyst, e.g. an acid polymerization catalyst, such as, for example, a polymeric catalyst which contains sulfonic acid groups as described below, in a continuous stirred tank reactor held at a temperature of from about 40 to about 80° C., followed by distilling off the unreacted tetrahydrofuran, alkylene oxide and other volatile byproducts, filtering to remove any catalyst fines and other solids present, and then distilling off the oligomeric cyclic ether by-products, and recovering the poly(tetramethylene-co-alkyleneether) glycol.

Advantageously, the alkylene oxide copolymer of alkylene oxide and tetrahydrofuran, i.e. poly(tetramethylene-co-alkyleneether) glycol, required for use herein is manufactured by the process comprising:

a) polymerizing tetrahydrofuran and at least one alkylene oxide having from 2 to 4 carbon atoms in the presence of an acid catalyst and at least one compound containing reactive hydrogen atoms at a temperature of from about 40° C. to about 80° C., for example, from about 56° C. to about 72° C., to produce a polymerization product mixture comprising alkylene oxide copolymer, copolyether glycol, at least one dimer of the alkylene oxide, and tetrahydrofuran;
b) separating a majority of the tetrahydrofuran and at least a portion of the dimer of the alkylene oxide from the polymerization product mixture of step a) to produce a crude product mixture comprising alkylene oxide copolymer and copolyether glycol;
c) separating at least a portion of the alkylene oxide copolymer from the crude product mixture of step b) to produce an alkylene oxide copolymer stream comprising alkylene oxide copolymer, i.e. poly(tetramethylene-co-alkyleneether) glycol, and a stream comprising copolyether glycol; and
d) recovering the alkylene oxide copolymer stream of step c) and, optionally, recycling at least a portion of the recovered alkylene oxide copolymer stream to the polymerization step a).

In the above process, the alkylene oxide may be selected from, for example, the group consisting of ethylene oxide; 1,2-propylene oxide; 1,3-propylene oxide; 1,2-butylene oxide; 2,3-butylene oxide; 1,3-butylene oxide and combinations thereof. The compound containing reactive hydrogen atoms may be selected, for example, from the group consisting of water; ethylene glycol; 1,3-propanediol; 1,4-butanediol; neopentyl glycol; poly(tetramethylene ether) glycol having a molecular weight of from about 130 dalton to about 400 dalton, for example, from about 200 dalton to about 300 dalton; copolyether glycols having a molecular weight of from about 130 dalton to about 400 dalton, for example, from about 200 dalton to about 300 dalton; and combinations thereof. In this process, the preferred compound containing reactive hydrogen atoms is water. In this process, if the alkylene oxide comprises ethylene oxide, the dimer of the alkylene oxide will comprise 1,4-dioxane, and the temperature of step a) will, for example, be from about 56° C. to about 72° C.

In the above process, the acid catalyst may be, for example, selected from the group consisting of acidified natural or synthetic zeolites, acidified zirconium/tin sulfate compounds, compounds comprising at least one catalytically active hydrogen-containing molybdenum and/or tungsten moiety applied to an oxidic support, polymeric catalysts which contain sulfonic acid groups and combinations thereof. The acidified zeolites for use herein are exemplified by faujasite (described in EP-A 492807), zeolite Y, zeolite Beta (described in U.S. Pat. No. 3,308,069), ZSM-5 (described in U.S. Pat. No. 3,702,886), MCM-22 (described in U.S. Pat. No. 4,954,325), MCM-36 (described in U.S. Pat. No. 5,250,277), MCM-49 (described in U.S. Pat. No. 5,236,575), MCM-56 (described in U.S. Pat. No. 5,362,697), PSH-3 (described in U.S. Pat. No. 4,439,409), SSZ-25 (described in U.S. Pat. No. 4,826,667) and the like. The acidified zirconium/tin sulfate compounds for use herein are exemplified by sulfated zirconia as illustrated in U.S. Pat. No. 5,149,862. The compounds comprising at least one catalytically active hydrogen-containing molybdenum and/or tungsten compound applied to an oxidic support are exemplified by $H_3PW_{12}O_{40}$ and $H_4SiMo_{12}O_{40}$ as described in Chem. Rev. 1998, 98, p 171-198. The polymeric catalysts which contain sulfonic acid groups for use herein are exemplified by the perfluorinated sulfonic acid resins as illustrated in U.S. Pat. No. 3,282,875. The preferred polymeric catalyst which contains sulfonic acid groups comprises a perfluorocarbon backbone and the side chain is represented by the formula:

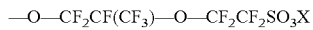

wherein X is H. Polymers of this latter type are disclosed in U.S. Pat. No. 3,282,875, and can be made by copolymerization of tetrafluoroethylene (TFE) and the perfluorinated vinyl ether $CF_2=CF-O-CF_2CF(CF_3)-O-CF_2CF_2SO_2F$, perfluoro(3,6-dioxa-4-methyl-7-octenesulfonyl fluoride) (PD-MOF), followed by conversion to sulfonate groups by hydrolysis of the sulfonyl fluoride groups, and acid exchanged as necessary to convert to the sulfonic acid form. The perfluorinated sulfonic acid resin may be pretreated (hydrotreated) by placing it along with deionized water at a weight ratio of resin/water of from about ¼ to about ¹⁄₁₀ into a clean stainless steel autoclave, heating to a temperature of, for example, from about 170° C. to about 210° C. under agitation, and holding at that temperature for up to about 12 hours, for example from about 1 hour to about 8 hours.

In the above process, the tetrahydrofuran component may further comprise at least one alkyltetrahydrofuran selected from the group consisting of 2-methyltetrahydrofuran, 3-methyltetrahydrofuran, 3-ethyltetrahydrofuran, and combinations thereof.

In the above process for manufacture of the alkylene oxide copolymer of alkylene oxide and tetrahydrofuran, i.e. poly(tetramethylene-co-alkyleneether) glycol, for use herein, the separation of step b) may be accomplished by generally accepted separation technology, and may comprise at least one distillation, and the separation of step c) may be accomplished by generally accepted separation technology, and may comprise an operation selected from the group consisting of short-path distillation, film evaporation, flash evaporation, solvent extraction and combinations thereof.

The above process may further comprise separating at least a portion of the tetrahydrofuran obtained in step b) from the dimer of the alkylene oxide copolymer obtained in step b), and optionally recycling at least a portion of the tetrahydrofuran so obtained to the polymerization step a). This separation may be accomplished by generally accepted separation technology.

In the above process, when the alkylene oxide is ethylene oxide, an especially useful glycol derived from ethylene oxide and tetrahydrofuran is manufactured.

In this later process situation, alkylene oxide copolymer of ethylene oxide and tetrahydrofuran, i.e. poly(tetramethylene-co-ethyleneether) glycol, especially useful herein, is manufactured by the steps of:
a) polymerizing tetrahydrofuran and ethylene oxide in the presence of an acid catalyst described above, for example, a polymeric catalyst which contains sulfonic acid groups, and at least one compound containing reactive hydrogen atoms selected from the group consisting of water, 1,4-butanediol, poly(tetramethylene ether) glycol having a molecular weight of from about 130 dalton to about 400 dalton, for example, from about 200 dalton to about 300 dalton, and poly(tetramethylene-co-ethyleneether) glycol having a molecular weight of from about 130 dalton to about 400 dalton, for example, from about 200 dalton to about 300 dalton, for example, water, in the temperature range of from about 50° C. to about 80° C., for example, from about 56° C. to about 72° C., to produce a polymerization product mixture comprising alkylene oxide copolymer, i.e. poly(tetramethylene-co-ethyleneether) glycol, copolyether glycol, 1,4-dioxane, and tetrahydrofuran;

b) separating a majority of the tetrahydrofuran and at least a portion of the 1,4-dioxane from the polymerization product mixture of step a) to produce a crude product mixture comprising alkylene oxide copolymer and copolyether glycol;

c) separating at least a portion of the alkylene oxide copolymer from the crude product mixture of step b) to produce an alkylene oxide copolymer stream comprising alkylene oxide copolymer and a stream comprising copolyether glycol; and d) recovering the alkylene oxide copolymer stream of step c) and, optionally, recycling at least a portion of the recovered alkylene oxide copolymer stream to the polymerization step a).

In the later process situation, the tetrahydrofuran component may further comprise at least one alkyltetrahydrofuran selected from the group consisting of 3-methyltetrahydrofuran, 3-ethyltetrahydrofuran and combinations thereof. In this later process situation, the separation of step b) may be accomplished by generally accepted separation technology, and may comprise at least one distillation, and the separation of step c) may be accomplished by generally accepted separation technology, and may comprise an operation selected from the group consisting of short-path distillation, film evaporation, flash evaporation, solvent extraction and combinations thereof. The later process situation may further comprise separating at least a portion of the tetrahydrofuran obtained in step b) from the 1,4-dioxane obtained in step b) by generally accepted separation technology, and optionally recycling at least a portion of the tetrahydrofuran so obtained to the polymerization step a).

The method of the present invention for manufacturing a stable homogeneous mixture of two or more otherwise generally immiscible organic components, i.e. compounds, involves the steps of (1) combining or mixing the generally immiscible organic components with the alkylene oxide copolymer, i.e. the poly(tetramethylene-co-alkyleneether) glycol, as manufactured above, in a vessel, (2) heating the combination or mixture of step (1) at a temperature at which all materials are liquid (typically from about 35° C. to about 65° C., for example, from about 40° C. to about 60° C., to form a compatibilized, single-phase product stable in the liquid phase at a temperature of from about 40° C. to about 200° C., and (3) recovering the compatibilized, single-phase product stable in the liquid phase at a temperature of from about 40° C. to about 200° C. The combination of step (1) comprises from about 10 to about 45 wt. %, for example, from about 12 to about 40 wt. %, first organic compound(s), such as, for example, short chain glycols; from about 10 to about 45 wt. %, for example, from about 12 to about 40 wt. %, other, i.e. second, organic compound(s) generally immiscible with said first organic compound(s), such as, for example, long chain polyols; and from about 10 to about 80 wt. %, for example, from about 20 to about 76 wt. %, of the alkylene oxide copolymer, e.g. poly(tetramethylene-co-ethyleneether) glycol.

For recovered product testing purposes, once the combination of step (1) has been heated at the required temperature in step (2), a visual determination of homogeneity of the recovered step (3) product can be made by shaking the recovered product in an appropriate vessel. Immiscible mixtures will appear hazy or multi-phased. This visual determination test may be a "yes/no" determination in which the presence or absence of two of more layers or turbidity in the shaken sample is an indication of miscibility (yes) versus immiscibility (no). The number of phases can also be identified, as done hereinbelow. Similar homogeneity determinations were used in U.S. Pat. Nos. 4,226,757, 4,385,133, 6,063,308, and 6,093,342.

The novel compatibilized product of the present invention and blends or mixtures comprising same, may further comprise, if desired, an effective amount of a stabilizer, such as, for example, to prevent color formation. Many such stabilizers are known in the art, any of which may be used with the presently disclosed compatibilized product. Among the stabilizers available for use with the present invention are phosphorus oxo acids, acid organo phosphates, acid phosphate metal salts, acidic phosphate metal salts and combinations thereof.

The novel compatibilized product of the present invention and blends or mixtures comprising same, may further comprise, if desired, an effective amount of a colored pigment. Many colored pigments for use with the product of the present invention and mixtures comprising same are known in the art, any of which may be used. Among the pigments available for use with the present invention are carbon black, phthalocyanine blues, phthalocyanine greens, anthraquinone dyes, scarlet 2b Lake, azo compounds, acid azo pigments, quinacridones, chromophthalocyanine pyrrols, halogenated phthalocyanines, quinolines, heterocyclic dyes, perinone dyes, anthracenedione dyes, thiozanthene dyes, parazolone dyes, polymethine pigments and combinations thereof.

The novel compatibilized product of the present invention and blends or mixtures comprising same, may also be combined, if desired, with other or additional additives or compounds to provide the compositions with particular, desirable characteristics. Many such additives and compounds are known in the art. The use of appropriate additives or compounds is well within the skill of one in the art. Examples of such other or additional additives or compounds include UV stabilizers, anti-oxidants, light stabilizers, flame retardants, antistatic agents, biocides, fragrances, viscosity-breaking agents, impact modifiers, plasticizers, fillers, reinforcing agents, lubricants, mold release agents, blowing agents, nucleating agents and the like.

EXAMPLES

The presently described and claimed method and compatibilized product will be understood more fully by reference to the Examples below without intention of restricting the scope of the present claims.

Example 1

A poly(tetramethylene-co-ethyleneether) glycol sample with about 40 mole % ethyleneether units and 1000 dalton molecular weight was prepared by contacting a solution of 89.4 parts THF, 9.7 parts ethylene oxide, and 0.9 parts water with a polymeric catalyst which contains sulfonic acid groups as described above, hydrotreated as described above, in a continuous stirred tank reactor held at 58° C., followed by distilling off the unreacted THF and ethylene oxide, filtering to remove any catalyst fines present, and then distilling off the cyclic ether by-products and recovering poly(tetramethylene-co-ethyleneether) glycol.

Example 2

A poly(tetramethylene-co-ethyleneether) glycol sample with about 50 mole % ethyleneether units and 1000 dalton molecular weight was prepared by contacting a solution of 79.5 parts THF, 19.2 parts ethylene oxide, and 1.3 parts water with polymeric catalyst which contains sulfonic acid groups as described above, hydrotreated as described above, in a continuous stirred tank( reactor held at 58° C., followed by distilling off the unreacted THF and ethylene oxide, filtering to remove any catalyst fines present, and then distilling off the cyclic ether by-products and recovering poly(tetramethylene-co-ethyleneether) glycol.

Example 3

Twelve separate mixtures of PTMEG having an average molecular weight of about 1,000 (Component a), ethylene glycol (Component b), and poly(tetramethylene-co-ethyleneether) glycol prepared as in Example 1 containing about 40 mole % ethylene oxide-derived units and having an average molecular weight of about 1,000 (Component c), were combined in clear glass containers in the approximate weight fraction proportions shown in Table 1, and the mixtures were placed in an oven heated at 50° C. After one hour in the oven the mixtures were observed and a visual determination of homogeneity at 40° C. was made as indicated above.

TABLE 1

| Reference | Component a | Component b | Component c | No. of phases at @40° C. |
|---|---|---|---|---|
| 3-1 | 0.33 | 0.33 | 0.33 | 1 |
| 3-2 | 0.50 | 0.00 | 0.50 | 1 |
| 3-3 | 0.50 | 0.50 | 0.00 | 2 |
| 3-4 | 0.17 | 0.17 | 0.67 | 1 |
| 3-5 | 1.00 | 0.00 | 0.00 | 1 |
| 3-6 | 1.00 | 0.00 | 0.00 | 1 |
| 3-7 | 0.00 | 0.50 | 0.50 | 1 |
| 3-8 | 0.00 | 1.00 | 0.00 | 1 |
| 3-9 | 0.67 | 0.17 | 0.17 | 1 |
| 3-10 | 0.17 | 0.67 | 0.17 | 2 |
| 3-11 | 0.00 | 1.00 | 0.00 | 1 |
| 3-12 | 0.00 | 0.00 | 1.00 | 1 |

Example 4

Seventeen separate mixtures of PTMEG having an average molecular weight of about 1,000 (Component a), butanediol (Component b), and poly(tetramethylene-co-ethyleneether) glycol prepared as in Example 1 containing about 40 mole % ethylene oxide-derived units and having an average molecular weight of about 1,000 (Component c), were combined in clear glass containers in the approximate weight fraction proportions shown in Table 2, and the mixtures were placed in an oven heated at 50° C. After one hour in the oven the mixtures were observed and a visual determination of homogeneity at 40° C. was made as indicated above.

TABLE 2

| Reference | Component a | Component b | Component c | No. of phases at @40° C. |
|---|---|---|---|---|
| 4-1 | 0.33 | 0.33 | 0.33 | 1 |
| 4-2 | 0.50 | 0.00 | 0.50 | 1 |
| 4-3 | 0.50 | 0.50 | 0.00 | 2 |
| 4-4 | 0.17 | 0.17 | 0.67 | 1 |
| 4-5 | 1.00 | 0.00 | 0.00 | 1 |
| 4-6 | 1.00 | 0.00 | 0.00 | 1 |
| 4-7 | 0.00 | 0.50 | 0.50 | 1 |
| 4-8 | 0.00 | 1.00 | 0.00 | 1 |
| 4-9 | 0.67 | 0.17 | 0.17 | 1 |
| 4-10 | 0.17 | 0.67 | 0.17 | 2 |
| 4-11 | 0.00 | 1.00 | 0.00 | 1 |
| 4-12 | 0.00 | 0.00 | 1.00 | 1 |
| 4-13 | 0.75 | 0.25 | 0 | 2 |
| 4-14 | 0.25 | 0.75 | 0 | 2 |
| 4-15 | 0.50 | 0.25 | 0.25 | 1 |
| 4-16 | 0.25 | 0.50 | 0.25 | 2 |
| 4-17 | 0.00 | 0.75 | 0.25 | 2 |

Example 5

Twenty-three separate mixtures of PTMEG having an average molecular weight of about 1,000 (Component a), polyethylene glycol (Component b), and poly(tetramethylene-co-ethyleneether) glycol copolymer prepared as in Example 1 containing about 40 mole % ethylene oxide-derived units and having an average molecular weight of about 1,000 (Component c), were combined in clear glass containers in the approximate weight fraction proportions shown in Table 3, and the mixtures were placed in an oven heated at 50° C. After one hour in the oven the mixtures were observed and a visual determination of homogeneity at 40° C. was made as indicated above.

TABLE 3

| Reference | Component a | Component b | Component c | No. of phases at @40° C. |
|---|---|---|---|---|
| 5-1 | 0.33 | 0.33 | 0.33 | 1 |
| 5-2 | 0.50 | 0.00 | 0.50 | 1 |
| 5-3 | 0.50 | 0.50 | 0.00 | 2 |
| 5-4 | 0.17 | 0.17 | 0.65 | 1 |
| 5-5 | 1.00 | 0.00 | 0.00 | 1 |
| 5-6 | 1.00 | 0.00 | 0.00 | 1 |
| 5-7 | 0.00 | 0.50 | 0.50 | 1 |
| 5-8 | 0.00 | 1.00 | 0.00 | 1 |
| 5-9 | 0.66 | 0.17 | 0.17 | 1 |
| 5-10 | 0.17 | 0.66 | 0.17 | 2 |
| 5-11 | 0.00 | 1.00 | 0.00 | 1 |
| 5-12 | 0.00 | 0.00 | 1.00 | 1 |
| 5-13 | 0.35 | 0.65 | 0.00 | 2 |
| 5-14 | 0.18 | 0.66 | 0.16 | 2 |
| 5-15 | 0.00 | 0.70 | 0.30 | 1 |
| 5-16 | 0.51 | 0.30 | 0.19 | 1 |
| 5-17 | 0.00 | 1.00 | 0.00 | 1 |
| 5-18 | 0.18 | 0.82 | 0.00 | 2 |
| 5-19 | 0.70 | 0.30 | 0.00 | 2 |
| 5-20 | 0.51 | 0.47 | 0.02 | 2 |
| 5-21 | 0.70 | 0.30 | 0.00 | 2 |
| 5-22 | 0.24 | 0.46 | 0.30 | 1 |
| 5-23 | 0.00 | 0.85 | 0.15 | 1 |

Example 6

Twenty-one separate mixtures of a polyol (Component a) and an immiscible short or long chain glycol (Component b) were combined in clear glass containers in the approximate weight fraction proportions shown in Table 4, and the mixtures were placed in an oven heated at 50° C. After one hour in the oven the mixtures were observed and a visual determination of homogeneity at 40° C. was made as indicated above. To the mixtures was added a portion of poly(tetramethylene-co-ethyleneether) glycol copolymer prepared as in Example 2 containing about 50 mole % ethylene oxide-derived units and having an average molecular weight of about 1,000 (Component c). In Table 4, components "a" and "b" are abbreviated as follows: "a1" is a 1000 MW polytetramethylene ether glycol manufactured by INVISTA S.a.r.l. under the trade name Terathane® (T1000), "a2" is a 2000 MW polytetramethylene ether glycol manufactured by INVISTA S.a.r.l. under the trade name Terathane® (T2000), "a3" is polypropylene glycol, "a4" is polycaprolactone glycol and "a5" is a 2000 MW polyethylenebutylene adipate manufactured by Chemtura Corp. under the trade name Formrez® E2454 (E2454); and "b1" is ethylene glycol, "b2" is 1,3-propanediol (PDO), "b3" is 1,4-butanediol, "b4" is the 1000 MW polytetramethylene ether glycol T1000, "b5" is the 2000 MW polyethylenebutylene adipate E2454 and "b6" is polypropylene glycol. Component "c" is the poly(tetramethylene-co-ethyleneether) glycol copolymer prepared as in Example 2.

TABLE 4

| Components | | | Components a/b/c Weight Ratio | | | |
|---|---|---|---|---|---|---|
| Ref. | a | b | c | 50/50/00 | 37.5/37.5/25 | 25/25/50 | 12.5/12.5/75 |
| 6-1 | a1 | b1 | c | 2 | 2 | 1 | |
| 6-2 | a1 | b2 | c | 2 | 2 | 1 | |
| 6-3 | a1 | b3 | c | 2 | 1 | | |
| 6-4 | a2 | b1 | c | 2 | 2 | 2 | 2 |
| 6-5 | a2 | b2 | c | 2 | 2 | 2 | 2 |
| 6-6 | a2 | b3 | c | 2 | 2 | 2 | 1 |
| 6-7 | a3 | b1 | c | 2 | 2 | 1 | |
| 6-8 | a3 | b2 | c | 2 | 2 | 1 | |
| 6-9 | a3 | b3 | c | 2 | 2 | 1 | |
| 6-10 | a4 | b1 | c | 1 | | | |
| 6-11 | a4 | b2 | c | 2 | 2 | 1 | |
| 6-12 | a4 | b3 | c | 2 | 2 | 1 | |
| 6-13 | a5 | b1 | c | 2 | 2 | 2 | 2 |
| 6-14 | a5 | b2 | c | 2 | 2 | 2 | 2 |
| 6-15 | a5 | b3 | c | 2 | 2 | 2 | 2 |
| 6-16 | a3 | b4 | c | 1 | | | |
| 6-17 | a4 | b5 | c | 1 | | | |
| 6-18 | a4 | b6 | c | 1 | | | |
| 6-19 | a4 | b4 | c | 1 | | | |
| 6-20 | a5 | b6 | c | 2 | 2 | 2 | 2 |
| 6-21 | a5 | b4 | c | 2 | 2 | 2 | 2 |

Example 7

Five separate mixtures of a polyol (Component a) and polyethylene glycol (Component b) were combined in clear glass containers in the approximate weight fraction proportions shown in Table 5, and the mixtures were placed in an oven heated at 50° C. After one hour in the oven the mixtures were observed and a visual determination of homogeneity at 40° C. was made as indicated above. To the mixture was added a portion of poly(tetramethylene-co-ethyleneether) glycol copolymer prepared as in Example 2 containing about 50 mole % ethylene oxide-derived units and having an average molecular weight of about 1,000 (Component c). In Table 5, components are abbreviated as in Example 6 and Table 4.

TABLE 5

| Components | | | Components a/b/c Weight Ratio | | | |
|---|---|---|---|---|---|---|
| No. | a | b | c | 50/50/00 | 37.5/37.5/25 | 25/25/50 | 12.5/12.5/75 |
| 7-1 | a1 | PEG | c | 2 | 1 | | |
| 7-2 | a2 | PEG | c | 2 | 2 | 1 | |
| 7-3 | a3 | PEG | c | 2 | 2 | 1 | |
| 7-4 | a4 | PEG | c | 1 | | | |
| 7-5 | a5 | PEG | c | 1 | | | |

Example 8

A mixture of polyethylene glycol (1931 MW) and polyols was prepared and heated at 50° C. When thermal equilibrium was reached, the blend was degassed, combined with sufficient diisocyante (Dow Isonate® 181), curative (BDO), and catalyst (Dabco® 131) to produce elastomers of the desired hard segment content (Table 6). "EOTHF" is poly(tetramethylene-co-ethyleneether) glycol copolymer prepared as in Example 2. The combined materials were transferred to a mold and cured at 100° C. for 16 hours. After an additional 2 weeks at room temperature, the elastomers were tested for equilibrium water swell using a procedure equivalent to ASTM D570.

TABLE 6

| | Reference | |
|---|---|---|
| | 8-1 | 8-2 |
| PTMEG (2027 MW) | 25 | 25 |
| PEG (1931 MW) | 25 | 25 |
| EOTHF (50% EO, 964 MW) | 50 | — |
| PTMEG (970 MW) | — | 50 |
| Homogeneous @ 50° C. | Yes | No |
| Isonate ® 181 (360.4 MW) | 72 | 72 |
| BDO (90 MW) | 10 | 10 |
| Dabco ® 131 | .006 | .006 |
| Weight increase, % (ASTM D570) | 24% | 12% |

Example 9

A mixture of polyethylene glycol (966 MW) and polyols was prepared and heated at 50° C. When thermal equilibrium was reached, the blend was degassed, combined with sufficient diisocyante (Dow Isonate® 181), curative (BDO), and catalyst (Dabco® 131) to produce elastomers of the desired hard segment content (Table 7). "EOTHF" is poly(tetramethylene-co-ethyleneether) glycol copolymer prepared as in Example 2. The combined materials were transferred to a mold and cured at 100° C. for 16 hours. After an additional 2 weeks at room temperature, the elastomers were tested for water uptake.

TABLE 7

| | Reference | |
|---|---|---|
| | 9-1 | 9-2 |
| PTMEG (970 MW) | 25 | 75 |
| PEG (966 MW) | 25 | 25 |
| EOTHF (50% EO, 964 MW) | 50 | — |
| PTMEG (970 MW) | — | 50 |
| Homogeneous @ 50° C. | Yes | No |
| Isonate ® 181 (360.4 MW) | 74 | 74 |
| BDO (90 MW) | 8.2 | 8.2 |
| Dabco ® 131 | .005 | .005 |
| Weight increase, % (ASTM D570) | 15% | 10% |

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method for manufacturing a stable compatibilized mixture of two or more immiscible organic compounds, the method consisting of steps (1) combining the two or more immiscible organic compounds with from about 10 to about 80 wt. % glycol derived from polymerization of alkylene oxide having from 2 to 4 carbon atoms and tetrahydrofuran, (2) heating the combination of step (1) at a temperature of from about 35° C. to about 65° C., and (3) recovering a compatibilized product mixture stable in the liquid phase at a temperature of from about 40° C. to about 200° C., said compatibilized product mixture consisting of the two or more immiscible organic compounds and the glycol derived from polymerization of alkylene oxide having from 2 to 4 carbon atoms and tetrahydrofuran.

2. The method of claim 1 wherein said immiscible organic compounds are a first organic compound selected from the group consisting of short chain glycols, polyethers and mixtures thereof, and a second organic compound selected from the group consisting of long chain polyols, polyesters and mixtures thereof.

3. The method of claim 1 wherein said compatibilized product mixture of step (3) is stable in the liquid phase at a temperature of from about 50° C. to about 100° C.

4. The method of claim 2 wherein said first organic compound is selected from the group consisting of ethylene glycol, polyethylene glycol, polypropylene glycol, butanediol and mixtures thereof, and said second organic compound is a polyether polyol.

5. The method of claim 2 wherein said first organic compound is selected from the group consisting of ethylene glycol, butanediol and mixtures thereof, and said second organic compound is selected from the group consisting of polytetramethylene ether glycol, polypropylene glycol, polycaprolactone glycol or a mixture thereof.

6. The method of claim 2 wherein said first organic compound is polyethylene glycol, and said second organic compound is selected from the group consisting of polytetramethylene ether glycol, polypropylene glycol or a mixture thereof.

7. The method of claim 1 wherein said combination of step (1) consists of from about 10 to about 45 wt. % of one or a mixture of first organic compounds, and from about 10 to about 45 wt. % of one or a mixture of second organic compounds generally immiscible with said first organic compounds.

8. The method of claim 7 wherein said first organic compound is selected from the group consisting of short chain glycols, polyethers and mixtures thereof, and said second organic compound is selected from the group consisting of long chain polyols, polyesters and mixtures thereof.

9. The method of claim 7 wherein said compatibilized product mixture of step (3) is stable in the liquid phase at a temperature of from about 50° C. to about 100° C.

10. The method of claim 8 wherein said first organic compound is selected from the group consisting of ethylene glycol, polyethylene glycol, polypropylene glycol, butanediol and mixtures thereof, and said second organic compound is a polyether polyol.

11. The method of claim 7 wherein said first organic compound is selected from the group consisting of ethylene glycol, butanediol and mixtures thereof, and said second organic compound is selected from the group consisting of polytetramethylene ether glycol, polypropylene glycol, polycaprolactone glycol or a mixture thereof.

12. The method of claim 7 wherein said first organic compound is polyethylene glycol, and said second organic compound is selected from the group consisting of polytetramethylene ether glycol, polypropylene glycol or a mixture thereof.

* * * * *